US010745301B2

(12) United States Patent
Mandewalkar et al.

(10) Patent No.: US 10,745,301 B2
(45) Date of Patent: *Aug. 18, 2020

(54) SYSTEM TO REDUCE INTERFACE EMULSION LAYER FORMATION IN AN ELECTROSTATIC DEHYDRATOR OR DESALTER VESSEL THROUGH USE OF A LOW VOLTAGE ELECTROSTATIC INTERFACE EMULSION TREATMENT SYSTEM INSIDE THE VESSEL

(71) Applicant: Cameron Solutions, Inc., Houston, TX (US)

(72) Inventors: S. Pavankumar B. Mandewalkar, Houston, TX (US); Marcus D. Sprenkel, Houston, TX (US); Gary W. Sams, Spring, TX (US)

(73) Assignee: CAMERON SOLUTIONS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,314

(22) Filed: Oct. 18, 2018

(65) Prior Publication Data

US 2019/0112205 A1 Apr. 18, 2019

Related U.S. Application Data

(63) Continuation of application No. 14/674,081, filed on Mar. 31, 2015, now Pat. No. 10,112,850.

(51) Int. Cl.
*B01D 17/02* (2006.01)
*B01D 17/04* (2006.01)
(Continued)

(52) U.S. Cl.
CPC .............. *C02F 1/48* (2013.01); *B01D 17/02* (2013.01); *B01D 17/0208* (2013.01);
(Continued)

(58) Field of Classification Search
CPC .......................... B01D 17/02; B01D 17/0208; B01D 17/0214; B01D 17/40; B01D 17/045;
(Continued)

(56) References Cited

U.S. PATENT DOCUMENTS 2,849,395 A 8/1958 Wintermute
4,209,374 A 6/1980 Martin
(Continued)

OTHER PUBLICATIONS

European Patent Office Communication dated Jul. 17, 2018, issued in corresponding European Patent Application No. 16 716 954.9-1101.

(Continued)

*Primary Examiner* — Benjamin L Lebron
(74) *Attorney, Agent, or Firm* — Hauptman Ham, LLP; Ronald G. Embry, Jr.

(57) ABSTRACT

A system for separating the components of an incoming oil-water mixture includes two electrode sets, one set arranged to apply an electrostatic field to an oil layer residing within a separator vessel and the other set arranged to apply an electrostatic field to the interface emulsion layer residing within the separator vessel. The first set of electrodes is in communication with a high voltage power source that ranges from 1 to 60 kV; the second set of electrodes is in communication with a low voltage power source that is no greater than 5 kV. Each set of electrodes may also be in communication with a second voltage source to provide increased power to promote effective coalescence. The system may also include power electronics to produce a variable amplitude and a variable frequency voltage supply to one or both electrode sets.

18 Claims, 3 Drawing Sheets

(51) Int. Cl.
  *B01D 17/06* (2006.01)
  *B03C 5/02* (2006.01)
  *B03C 11/00* (2006.01)
  *C02F 1/40* (2006.01)
  *C02F 1/463* (2006.01)
  *C02F 1/48* (2006.01)
  *C10G 32/02* (2006.01)
  *C10G 33/02* (2006.01)
  *C02F 101/32* (2006.01)
  *C02F 103/28* (2006.01)
  *C02F 103/30* (2006.01)
  *C02F 103/32* (2006.01)
  *C02F 103/36* (2006.01)

(52) U.S. Cl.
  CPC ......... *B01D 17/0214* (2013.01); *B01D 17/04* (2013.01); *B01D 17/045* (2013.01); *B01D 17/06* (2013.01); *B03C 5/02* (2013.01); *B03C 11/00* (2013.01); *C02F 1/40* (2013.01); *C02F 1/463* (2013.01); *C10G 32/02* (2013.01); *C10G 33/02* (2013.01); *B03C 2201/02* (2013.01); *C02F 2101/32* (2013.01); *C02F 2103/28* (2013.01); *C02F 2103/30* (2013.01); *C02F 2103/32* (2013.01); *C02F 2103/365* (2013.01); *C02F 2201/46135* (2013.01)

(58) Field of Classification Search
  CPC ........... B01D 17/06; B03C 5/02; B03C 11/00; B03C 2201/02; C02F 1/40; C02F 1/463; C02F 1/48; C02F 2101/32; C02F 2103/28; C02F 2103/30; C02F 2103/32; C02F 2103/365; C02F 2201/46136; C02F 2201/46135; C10G 32/02; C10G 33/02
  See application file for complete search history.

(56) References Cited

U.S. PATENT DOCUMENTS

| | | |
|---|---|---|
| 4,252,631 A | 2/1981 | Hovarongkura et al. |
| 4,479,164 A | 10/1984 | Siegel |
| 5,861,087 A | 1/1999 | Manning |
| 6,348,155 B1 | 2/2002 | Conway et al. |
| 7,351,320 B2 | 4/2008 | Sams |
| 2001/0017264 A1 | 8/2001 | Klippel |
| 2003/0217971 A1 | 11/2003 | Varadaraj et al. |
| 2005/0036924 A1 | 2/2005 | Nilsen et al. |
| 2005/0040045 A1 | 2/2005 | Nilsen et al. |
| 2008/0116072 A1 | 5/2008 | Liverud et al. |
| 2009/0159426 A1 | 6/2009 | Chen |
| 2009/0159534 A1 | 6/2009 | Bjorklund et al. |
| 2009/0255816 A1 | 10/2009 | Tryti et al. |
| 2013/0126357 A1 | 5/2013 | Sams et al. |

OTHER PUBLICATIONS

SPE 10221 In-Field Emulsion Treatability Test With the Electrostatic Susceptability Tester; Joseph Lee and Ted Frankiewicz, Copyright 2006, Society of Petroleum Engineers.
International Search Report and Written Opinion issued in PCT Application PCT/US2016/022278, dated Jun. 6, 2016 (12 pages).
International Preliminary Report on Patentability issued in PCT Application PCT/US2016/022278, dated Oct. 3, 2017 (7 pages).

SYSTEM TO REDUCE INTERFACE EMULSION LAYER FORMATION IN AN ELECTROSTATIC DEHYDRATOR OR DESALTER VESSEL THROUGH USE OF A LOW VOLTAGE ELECTROSTATIC INTERFACE EMULSION TREATMENT SYSTEM INSIDE THE VESSEL

CROSS-REFERENCE TO RELATED APPLICATIONS

This application is a continuation of co-pending U.S. patent application Ser. No. 14/674,081 filed Mar. 31, 2015, which is incorporated by reference herein.

BACKGROUND OF THE INVENTION

This invention relates to systems, apparatuses, and methods for treating the interface emulsion or "rag" that accumulates at the oil/water interface inside of separation, dehydration, and desalting vessels.

In many industries, including oil, paper and pulp, textiles, and food processing, various processes produce contaminated water as a by-product. This is especially true in crude oil production and refining because substantially all crude oil is produced from subterranean formations which contain water.

The basic method of separating a mixture of oil and water is by use of gravity. For this purpose, separator vessels are frequently employed at the point where the crude oil first reaches the earth's surface. These separators range from rather unsophisticated holding vessels-which simply provide an enclosed container wherein the oil and water mixture can rest with reduced turbulence, thereby allowing the oil to float to an upper part of the vessel and water to settle to a lower part of the vessel-to more sophisticated vessels that apply desalting and dehydration methods, including the use of electrostatic fields in the oil layer of the vessel (see e.g. FIG. 1).

Regardless of the type of vessel used, it is common for oil-coated solids ("mud") to accumulate in the bottom of the vessel and for a mixture of oil and water ("emulsion" or "rag") to form at the oil and water interface. The rag layer tends to be a very stable layer that includes, in addition to oil and water, such things as excess chemicals, fine solids, scale, iron sulfides, and other residual particles. If this rag layer is not treated effectively, it can hinder coalescence of water droplets within the vessel and, therefore, compromise the efficiency of the vessel.

Because of the potential for the rag layer to compromise vessel efficiency (and therefore effectiveness), prior art dehydrator and desalter vessels are designed with increased volume to allow for rag layer formation up to a certain maximum height or depth. The accumulated rag layer is then periodically drawn off from the vessel, treated outside the vessel, or in most cases circulated back to the vessel. Shutting down a vessel to withdraw the rag layer disrupts the separation, dehydration, and desalting process, thereby disrupting the crude oil production or refining process, and, in many cases, requires extra vessels to handle production when one or more vessels are shut down.

A need exists for systems, apparatuses, and methods to better control the rag layer in order to keep vessel performance stable within an optimum range and prevent the layer's build-up past the point at which vessel performance is compromised.

SUMMARY OF THE INVENTION

A system for separating the components of an incoming oil-water mixture includes two sets of electrodes, one set arranged to apply an electrostatic field to an oil layer residing within a separator vessel and the other set arranged to apply an electrostatic field to an interface emulsion layer residing within the separator vessel below the oil layer and above a water layer. The first set of electrodes is in communication with a high voltage power source; the second set of electrodes is in communication with a low voltage power source. The high voltage power source is preferably in a range of 1 to 60 kV. The low voltage power source is preferably no greater than 5 kV.

Each set of electrodes may also be in communication with a second voltage source to provide increased power to promote effective coalescence. The system may also include power electronics to produce a variable amplitude and a variable frequency voltage supply to at least one of the first and second set of electrodes.

The objects of this invention include providing a system, apparatus, and method which provide better control of rag layer build-up in order to (1) keep vessel performance stable within an optimum range; (2) eliminate or reduce the need to shut down the vessel to remove and treat the rag layer; and (3) prevent the rag layer's build-up past the point at which vessel performance is compromised.

DETAILED DESCRIPTION OF THE PREFERRED EMBODIMENTS

Figure 1:
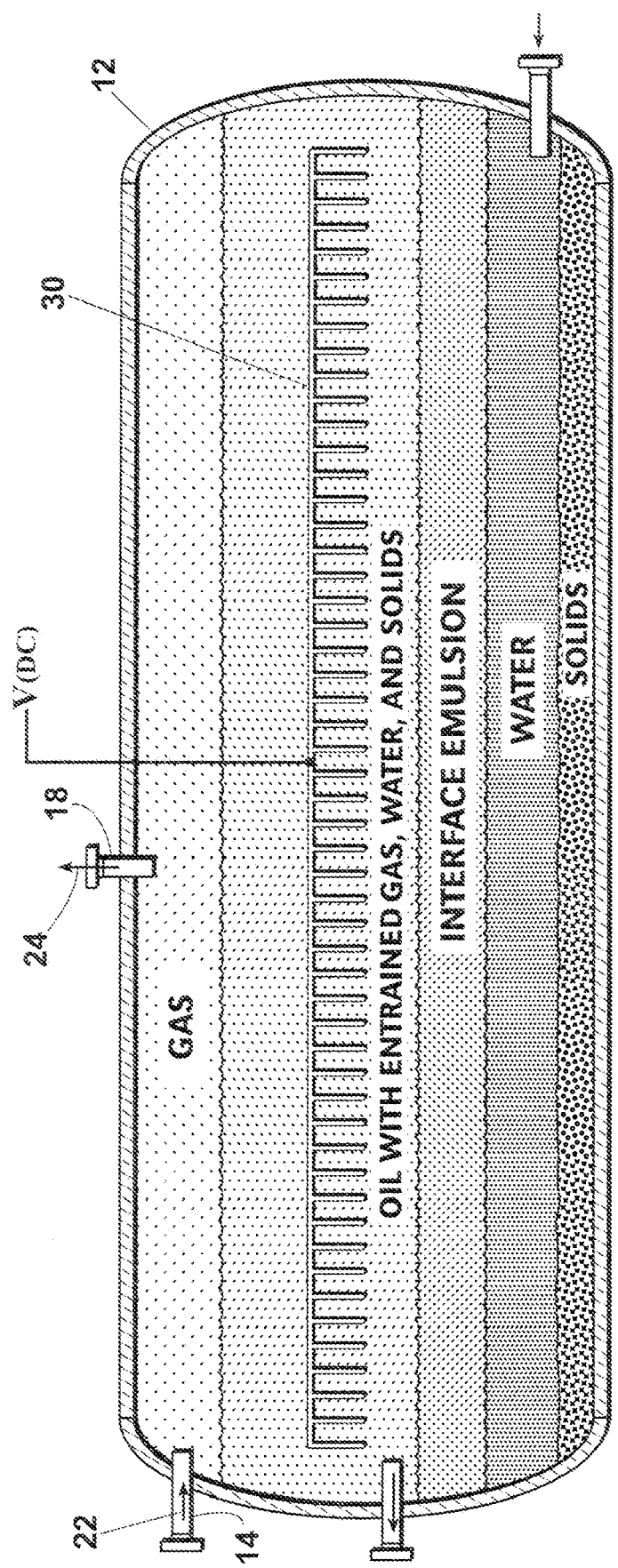
FIG. 1 is a view of a prior art dehydrator or desalter vessel having a high voltage electrode grid in the oil layer of the vessel.

A preferred embodiment of a system 10 made according to this invention includes a separator vessel 12 which may be of a horizontal or vertical type. For example, a NATCO® DUAL POLARITY® or DUAL FREQUENCY® or PETRECO® BILECTRIC® Electrostatic Treater (Cameron Process Systems, Houston, Tex.) could be used as the vessel 12.

A crude oil stream 22 containing entrained gas, water, and solid contaminants enters vessel 12 through an inlet 14. Vessel 12 holds and treats those components so that the oil might separate from the contaminants. The separated oil is then removed from vessel 12 through an outlet 20.

During the separation process, it is common for oil-coated solids, called mud, to accumulate in a bottom portion of vessel 12 and for a layer comprising a mixture of oil and water, called interface emulsion or rag, to form in an intermediate portion of vessel 12. The water accumulates between the layer of solids and the layer of interface emulsion. The gas contained in the upper portion of vessel 12 enters an outlet 18 and travels along path 24 for further processing, thereby eliminating the need to vent the gas contained in vessel 12. The oil accumulates above the interface emulsion, and the gas, in turn, typically accumulates above the oil in an upper portion of vessel 12.

Figure 2:
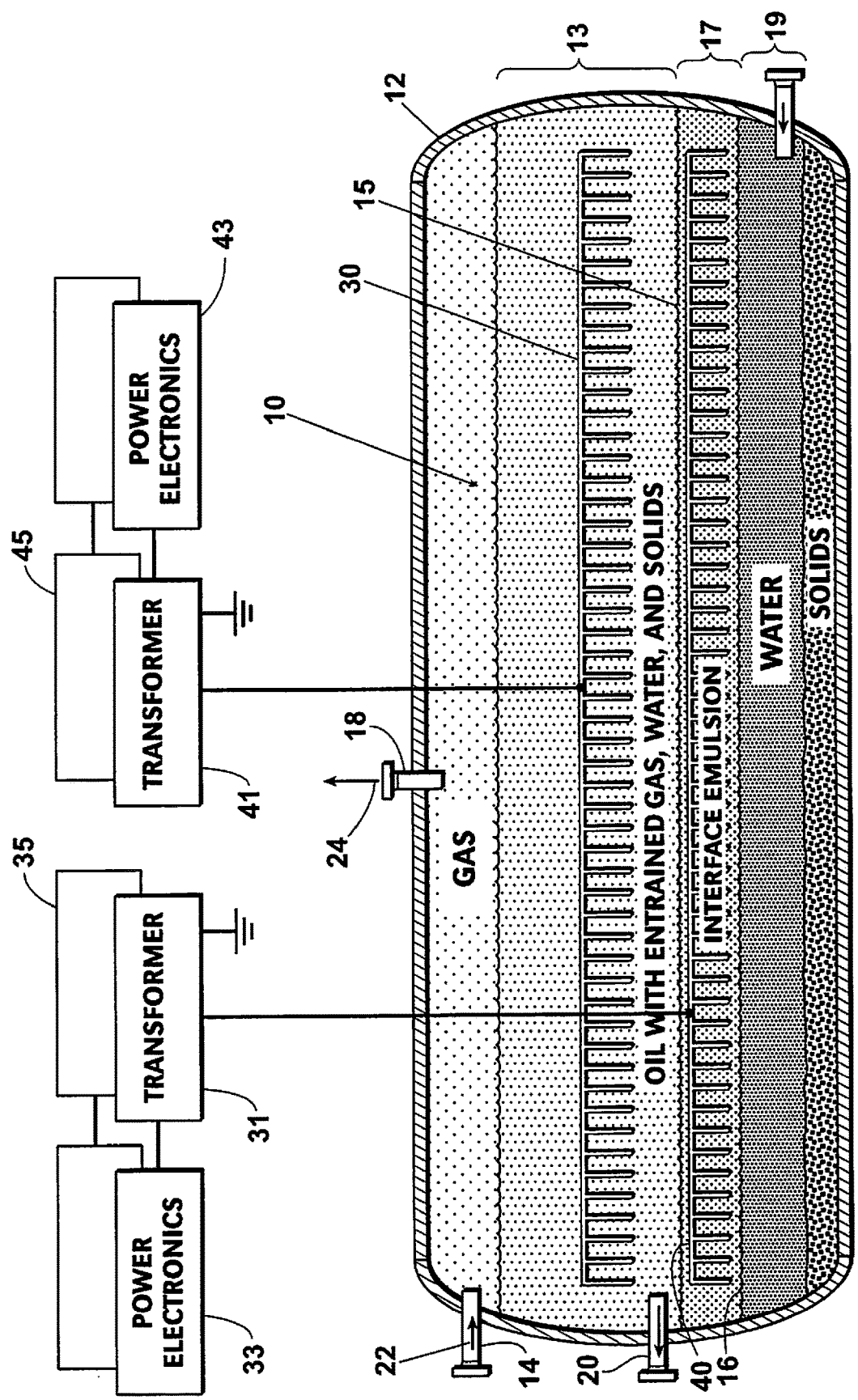
FIG. 2 is a view of a preferred embodiment of a dehydrator or desalter vessel having a high voltage electrode grid in the oil layer of the vessel and a low voltage electrode grid at the oil/water interface and in the interface emulsion or rag layer volume of the vessel.
Figure 3:
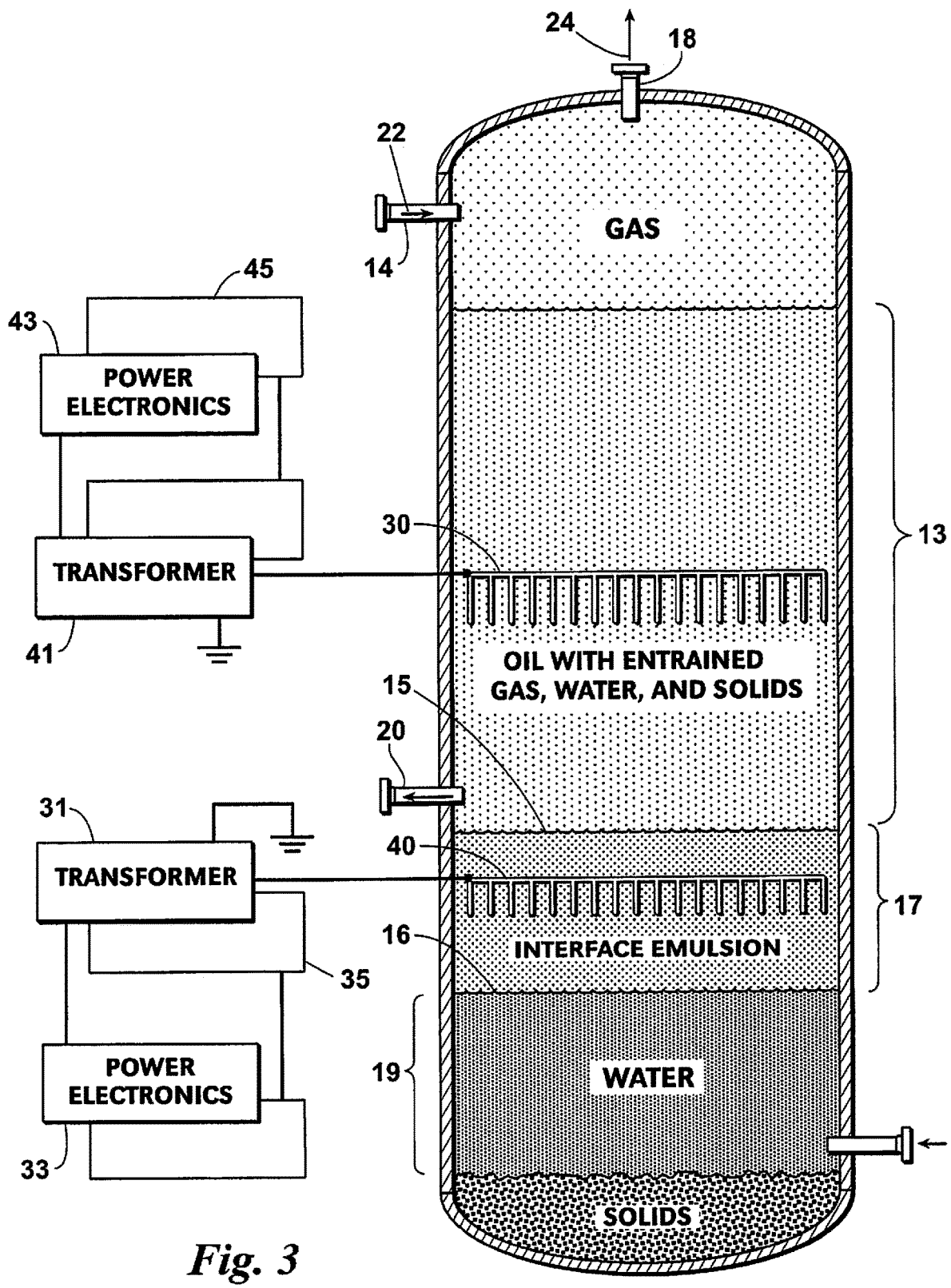
FIG. 3 is a view of an embodiment of a vertically oriented dehydrator or separator vessel having a high voltage electrode grid in the oil layer of the vessel and a low voltage electrode grid in the interface emulsion or rag layer of the vessel.

As shown in FIG. 2, a separator vessel 12 includes an electrode grid 30 in the oil layer. The electrode grid 30 is a high voltage grid in communication with a high voltage transformer and, preferably, power electronics to produce a variable amplitude and variable frequency voltage supply. Preferably, the voltage of electrode grid 30 ranges from 1 to 60 kV. The electrode grid 30 may include a single pair of electrodes or multiple pairs of electrodes. A medium frequency transformer may be provided for increased secondary voltage known to promote effective coalescence. This secondary voltage can be rectified so that polarized voltages can be applied to the electrode grid 30 to create the benefits of both AC and DC fields within vessel 12.

To promote water coalescence in the interface emulsion or rag layer, and therefore control the build-up of that layer, a second electrode grid 40 is located in the rag layer. The electrode grid 40 is in communication with a low voltage transformer and, preferably, power electronics that produce a variable amplitude and variable frequency voltage supply. Dual- or multiple-frequency systems and techniques like that disclosed in U.S. Pat. No. 7,351,320 B2 to Sams, which is hereby incorporated by reference, may be used. In some applications, two or more transformers may be used.

The electrode grid 40 may include a single pair of electrodes or multiple pairs of electrodes. Preferably, the voltage is no greater than 5 kV. The resulting electrostatic field promotes coalescence of the water droplets within the interface emulsion layer, thereby reducing the volume of this layer and increasing the effective residence time within vessel 12 and the performance of vessel 12.

EXPERIMENTAL RESULTS

An apparatus was developed to determine electrostatic field effects on rag layer volume reduction. The apparatus was a small-scale flow-through unit consisting of a chamber where voltage and temperature can be applied ranging from 1 to 5 kV, and 80° F. to 300° F., respectively. A rag layer feed sample obtained from a commercial separator was utilized for the analysis.

The experimental analysis was designed to determine the effects of applying the electrode grid in the rag layer at elevated operating temperature and pressure. Treated samples of the rag layer were collected for analysis of separation performance at two operating temperatures. The voltage remained reasonably constant at 1 kV when applied for each temperature. The separation performance was evaluated by centrifugal analysis (ASTM D4007 method) and gravitational separation rate at 5-minute intervals. Samples treated with low voltage are indicated as "Treated" below. "Untreated" samples did not have voltage applied and were utilized as a control. An Untreated rag sample showed no signs of water separation after it was permitted to settle for 30 minutes.

The separation performance for the Treated samples is summarized in the following table:

| Volume (mL) | Treated 240° F. | Treated 280° F. |
|---|---|---|
| | Centrifugal Analysis | |
| Total | 78.0 | 88.0 |
| Rag | 28.0 | 34.0 |
| Water | 43.4 | 52.5 |
| Solid | 6.6 | 1.5 |
| Time (min) | Gravity Settling Analysis (mL of free water) | |
| 5 | 62 | 20 |
| 10 | 80 | 30 |
| 15 | 90 | 35 |
| 20 | 90 | 50 |
| 25 | 90 | 50 |
| 30 | 90 | 50 |

Analytical results show an appreciable difference between the Treated and Untreated samples. The results of the Untreated sample are indicative of a highly stabilized emulsion. In particular, all of the water in the Untreated sample existed as rag, and no separation of free water occurred when the sample was rested for 30 minutes. After applying voltage, the Treated samples showed separation of free water and solids as well as a reduction in rag volume indicating destabilization. In particular, the Treated samples show increased free water separation in both centrifugal and gravitational analysis. The centrifugal analysis for the Treated samples also indicates an increase in solids release and a reduction in the volume of the rag layer. Increased temperature did not increase separation performance.

While the invention has been described with a certain degree of particularity, many changes could be made in the details of construction and the arrangement of components without departing from the spirit and scope of this disclosure. The invention is not limited to the preferred embodiments described herein. Instead, the invention is limited to the scope of the attached claims, including the full range of equivalency to which each element thereof is entitled.

The invention claimed is:

1. A system for reducing interface emulsion layer formation when separating the components of an incoming oil-water mixture, the system comprising:
   a separator vessel including
      an oil/water interface location including a water/emulsion boundary location;
      a first set of vertically oriented electrodes located in an upper half of the vessel and connected to a high voltage power source greater than 5 kV; and
      a second set of electrodes located entirely below the first set and above the water/emulsion boundary location and connected to a low voltage power source in a range of 1 kV to 5 kV, a portion of the second set being within the oil/water interface location.

2. The system of claim 1, further comprising variable frequency, variable amplitude power electronics in communication with the high voltage power source.

3. The system of claim 2, wherein the amplitude is modulated.

4. The system of claim 3, wherein the frequency is modulated.

5. The system of claim 1, wherein the high voltage power source is no greater than 60 kV.

6. The system of claim 1, further comprising an outlet at a level of the separator vessel between the first and second set of electrodes.

7. A separator vessel, comprising:
a first set of vertically oriented electrodes located in an upper half of the vessel and connected to a high voltage power source greater than 5 kV;
a second set of electrodes located entirely below the first set and connected to a low voltage power source in a range of 1 kV to 5 kV;
an oil outlet located at a vertical height between the first and second set of electrodes.

8. The separator vessel of claim 7, further comprising variable frequency, variable amplitude power electronics in communication with the high voltage power source.

9. The separator vessel of claim 8 wherein the amplitude is modulated.

10. The separator vessel of claim 9 wherein the frequency is modulated.

11. The separator vessel of claim 10, wherein the high voltage power source is no greater than 60 kV.

12. The separator vessel of claim 11, further comprising an inlet located at a vertical height above the first set of electrodes.

13. The separator vessel of claim 12, wherein the high voltage power source comprises a rectified transformer.

14. The separator vessel of claim 13, wherein at least one of the first and the second set of electrodes comprises an electrode grid.

15. A separator vessel, comprising:
a first set of vertically oriented electrodes located in an upper half of the vessel and connected to a high voltage power source greater than 5 kV;
a second set of electrodes located below the first set and connected to a low voltage power source in a range of 1 kV to 5 kV;
an oil outlet located at a vertical height between the first and second set of electrodes; and
an inlet located at a vertical height above the first set of electrodes.

16. The separator vessel of claim 15, further comprising variable frequency, variable amplitude power electronics in communication with the high voltage power source.

17. The separator vessel of claim 16, wherein the high voltage power source is no greater than 60 kV.

18. The separator vessel of claim 15, wherein at least one of the first and the second set of electrodes comprises an electrode grid.

* * * * *